(12) United States Patent
Yaeger

(10) Patent No.: US 10,083,214 B1
(45) Date of Patent: *Sep. 25, 2018

(54) METHOD AND SYSTEM FOR A FLEXIBLE ADO.NET PROVIDER BASED ON A CUSTOMIZED DYNAMIC-LINK LIBRARY

(75) Inventor: Marc Todd Yaeger, Hoover, AL (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 879 days.

This patent is subject to a terminal disclaimer.

(21) Appl. No.: 13/185,527

(22) Filed: Jul. 19, 2011

Related U.S. Application Data

(60) Provisional application No. 61/365,426, filed on Jul. 19, 2010.

(51) Int. Cl.
*G06F 17/30* (2006.01)

(52) U.S. Cl.
CPC ........ *G06F 17/30557* (2013.01); *G06F 17/30* (2013.01)

(58) Field of Classification Search
CPC ........................... G06F 17/30557; G06F 17/30
See application file for complete search history.

(56) References Cited

U.S. PATENT DOCUMENTS

| | | | |
|---|---|---|---|
| 2005/0187944 A1* | 8/2005 | Acheson | G06F 17/30595 |
| 2011/0307908 A1* | 12/2011 | Malnati | 719/328 |

OTHER PUBLICATIONS

Bob Beauchemin; ADO.NET: Building a Custom Data Provider for Use with the .NET Data Access Framework; Dec. 2001; 8 pages (http://msdn.microsoft.com/en-us/magazine/cc301611.aspx).*

* cited by examiner

*Primary Examiner* — Craig C Dorais
*Assistant Examiner* — Kimberly L Jordan

(57) ABSTRACT

Certain aspects of the present disclosure relates to a computer implemented method for executing application code to access data and a data source through a data-sharing application, the method including providing at least one flexible activex data object (ADO) .Net for the data source defined by at least one customized dynamic-link library (DLL). The at least one customized DLL may be loaded based on at least one identification in a configuration file in order to communicate to a service in at least one service layer in a network. The at least one flexible ADO.Net provider dll or library may be used to migrate at least one application for the data source.

20 Claims, 2 Drawing Sheets

METHOD AND SYSTEM FOR A FLEXIBLE ADO.NET PROVIDER BASED ON A CUSTOMIZED DYNAMIC-LINK LIBRARY

CROSS REFERENCE TO RELATED APPLICATIONS

This application claims priority from U.S. Provisional application Ser. No. 61/365,426 entitled 'FLEXIBLE ADO.NET PROVIDER' as filed on Jul. 19, 2010. The above application is incorporated herein by reference.

FIELD OF THE INVENTION

The disclosed embodiments relate to an executing application code to access data and a data source, and more particularly, to a method and a computing device to develop a customized data-sharing application for a flexible activex data object (ADO) .NET provider for a data source.

BACKGROUND OF THE INVENTION

Every day, new database application are developed that use integrated development environments (IDEs) to write database applications and data-sharing applications in programming languages such as C++, C#, Java™ from Sun Microsystems, Inc., etc. Generally, IDEs such as Microsoft Visual Studio® provide tools to help developers develop, debug, and analyze applications during development to work on platform such as Service-Oriented Architecture (SOA). Often database applications and data-sharing applications are written to include data access application programming interfaces (APIs) to make SQL queries from the applications during execution.

Activex Data Object.NET (ADO) is a programming module that provides consistent access to data sources such as Microsoft SQL Server, as well as data sources exposed through OLE DB and XML. ADO.NET provides intervening components to convert a common request message into the specific request message of a particular service. Data-sharing consumer applications can use ADO.NET to connect to these data sources and retrieve, manipulate, and update data. ADO.NET allows a client application to communicate with any available service through an existing ADO.NET interface. This removes the requirement for the client to contain unique customization for each service available in a network.

What is needed is a computer executable instruction wherein an instruction is used to determine which customized dynamic-link library (DLL) to load based upon an identification found in a configuration file in order to talk to a service in the service layer in the network.

Therefore, present invention disclosure describes such a tool that improves usability of the above mentioned applications.

SUMMARY OF THE INVENTION

Certain aspects of the present disclosure provide a computer implemented method for executing application code to access data and a data source through a data-sharing application. The method generally includes providing at least one flexible activex data object (ADO) .NET for the data source defined by at least one customized dynamic-link library (DLL); loading the at least one customized DLL based on at least one identification in a configuration file in order to communicate to a service in at least one service layer in a network; and using the at least one flexible ADO.Net provider dll or library to migrate at least one application for the data source.

Certain aspects of the present disclosure provide a computing device for executing application code to access data and a data source through a data-sharing application, the computing device. The computing device generally includes a processor; a memory operably coupled to the processor and storing instructions to configure the computing device to analyze computer code via operations to provide at least one flexible activex data object (ADO.NET) for the data source defined by at least one customized dynamic-link library (DLL); load the at least one customized dll based on at least one identification in a configuration file in order to communicate to a service in at least one service layer in a network; and use the at least one flexible ADO.Net provider dll or library to migrate at least one application for the data source.

Certain aspects of the present disclosure provide a computer readable media having computer-executable instructions embodied thereon, the computer-executable instructions upon execution configuring a computer to perform operations for executing application code to access data and a data source through a data-sharing application. The computer-readable medium includes code for providing at least one flexible activex data object (ADO) .NET for the data source defined by at least one customized dynamic-link library (DLL); loading the at least one customized DLL based on at least one identification in a configuration file in order to communicate to a service in at least one service layer in a network; and using the at least one flexible ADO.Net provider dll or library to migrate at least one application for the data source.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present disclosure.

Figure 1:
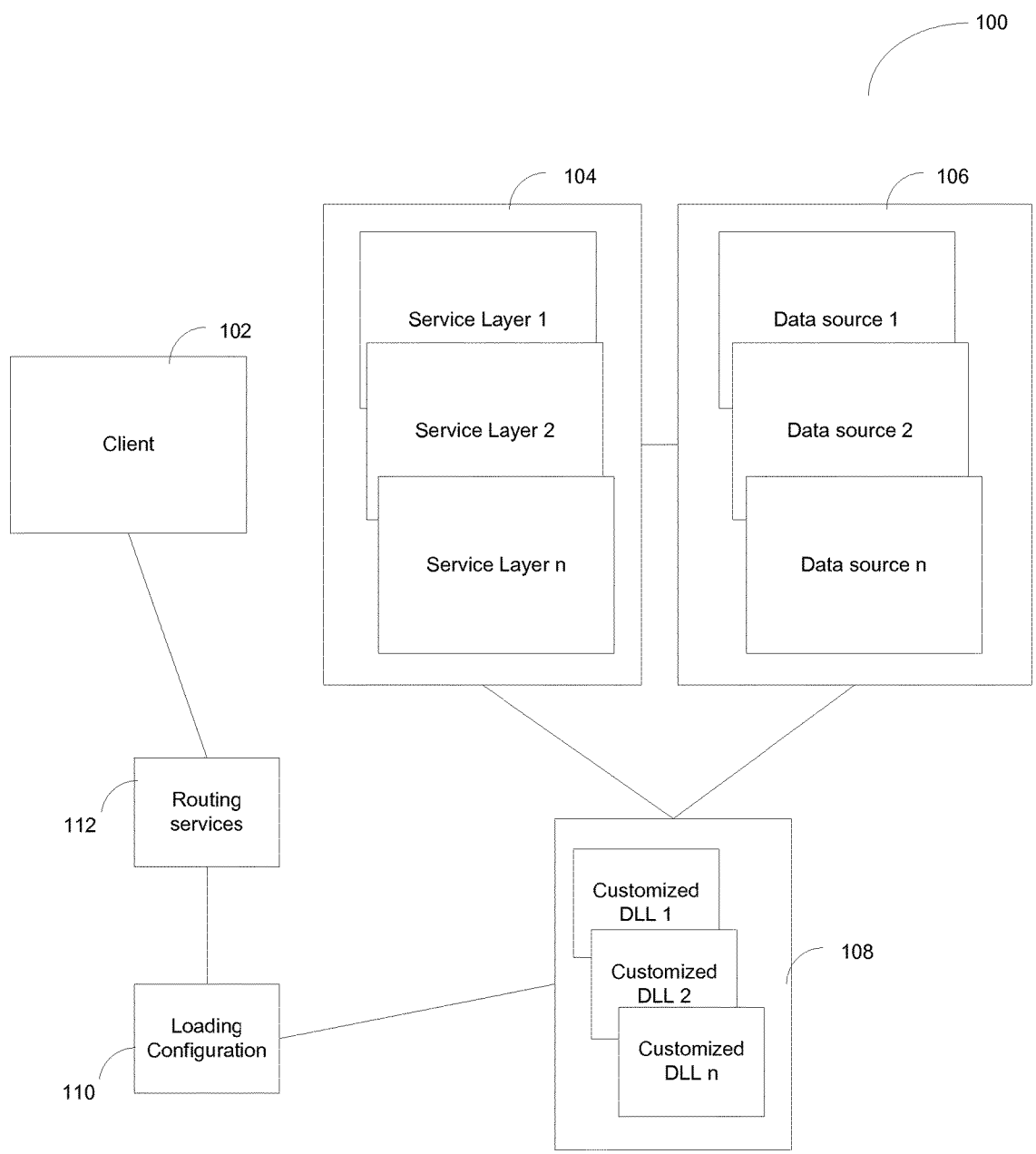
FIG. 1 illustrates a functional block diagram illustrating a computer implemented customized data-sharing application for a flexible activex data object (ADO) .NET for a data source in accordance with certain aspects of the disclosure.

The foregoing summary, as well as the following detailed description of certain embodiments of the present invention, will be better understood when read in conjunction with the appended drawings. The drawings illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

It should be observed that apparatus parts and components have been represented by conventional symbols in the drawings, showing only specific details that are relevant for an understanding of the present disclosure. Further, details that may be readily apparent to person ordinarily skilled in the art may not have been disclosed.

Aspects of the present invention may be used in a computing device to develop a customized data-sharing application for at least one flexible activex data object (ADO) .NET provider for a data source.

In an embodiment of the present invention the at least one flexible ADO.Net provider dll or library provider (FlexP) is an ADO.NET provider that may be installed on a computer implemented client workstation. With reference to FIG. 1 a functional block diagram is illustrated depicting a customized data-sharing application for the at least one flexible activex data object (ADO) .NET for a data source. The at least one FlexP includes computer readable instructions that may be displayed in a graphical user interface (GUI). The at least one FlexP may be installed on a client workstation as shown in 102. The at least one flexible ADO.Net provider dll or library may communicate with a routing service to route the at least one computer readable instruction from the at least one flexible ADO.Net provider dll or library to the at least one customized dynamic-link library (DLL) 108 to manage the at least one computer readable instruction. The customized DLLs may be installed on the server with a routing service.

ActiveX Data Object (ADO) is an application program interface from Microsoft that lets a programmer work on the Windows applications to get access to a relational or non-relational database from both Microsoft and other database providers. For example, to write a program that would provide a user of a Web site with data from an IBM DB2 database or an Oracle database, one could include ADO program statements in an HTML file that are then identified as an Active Server Page; then, when a user requested the page from the Web site, the page sent back would include appropriate data from a database, obtained using ADO code.

ADO.NET is a set of classes in NET programming language that allows access to a data source. ADO.NET includes classes that encapsulate data access for distributed applications. However, rather than simply mapping the existing ADO object model to NET to provide a managed interface to OLEDB and SQL Server, ADO.NET changes the way data is stored and marshaled within and between applications. The primary reason ADO.NET redefines this architecture is that most applications developed today can benefit from the scalability and flexibility of being able to distribute data across the Internet in a disconnected fashion.

The ODBC and OLDDB providers come standard with the .Net Framework. OLEDB is an application program interface (API) for access to different data sources. OLEDB includes not only the Structured Query Language (SQL) capabilities of the Microsoft-sponsored standard data interface Open Database Connectivity (ODBC) but also includes access to data other than SQL data. As a design from Microsoft's Component Object Model (COM), OLEDB is a set of methods (or routines) for reading and writing data. The objects in OLEDB consist mainly of a data source object, a session object, a command object, and a rowset object. An application using OLEDB would use this request sequence: (i) initialize OLE; (ii) connect to a data source; (iii) issue a command; (iv) process the results; and (v) release the data source object and uninitialize OLE. (While OLE once stood for "Object Link Embedding" and "DB" for database, many skilled artisans no longer ascribes these meanings to the letters "OLE" and "DB.").

Open Database Connectivity (ODBC) is an open standard application programming interface (API) for accessing a database. By using ODBC statements in a program, you can access files in a number of different databases, including Access, dBase, DB2, Excel, and Text. In addition to the ODBC software, a separate module or driver is needed for each database to be accessed. The main proponent and supplier of ODBC programming support is Microsoft. ODBC is based on and closely aligned with The Open Group standard Structured Query Language (SQL) Call-Level Interface. It allows programs to use SQL requests that will access databases without having to know the proprietary interfaces to the databases. ODBC handles the SQL request and converts it into a request the individual database system understands.

In an embodiment of the present invention the customized DLL's 108 may be created by a developer to handle specific computer readable instructions passed from the at least one flexible ADO.Net provider dll or library provider.

In certain aspect of the present invention at least one loading configuration 110 instructions may be a specific computer readable instruction that the routing service 112 may use to determine/find the correct customized DLL 108 from the command or computer readable instruction that may be passed from the flexible ADO.NET provider. The at least one flexible activex data object (ADO) .NET for the data source 106 may be defined by the at least one customized dynamic-link library (DLL).

Aspect of the present invention includes a consumer to interact with the FlexP services. All consumers request data through one standard interface and let the driver of the interface call in custom modules to handle the specific services requested. This is somewhat similar to the USB architecture or the PC/MCIA architecture where there is one main driver and it calls a specific driver for the device that is present for processing requests. The disclosure may be similar to such services and architecture for a peripheral device support. The services are self defining just like an XML document is self defining. A consumer of a SOA service can adapt based upon the definition of the service it receives.

In an embodiment of the present invention the at least one FlexP that may be directed to different data stores 106 based on the connection information and the commands used. But unlike an open database connectivity (ODBC) and an object linking database (OLEDB) provider, the at least one flexible ADO.Net provider dll or library may not require different libraries on the at least one workstation to communicate at least one computer readable instruction including the ODBC or OLDDB providers. Instead the FlexP communicates with a routing service 104 on a server that may route the commands from the FlexP to the correct customized DLLs to handle the command. The at least one flexible ADO.Net provider dll or library using the at least one customized DLL and the routing service may connect to any data store including the web services. The at least one customized DLL may be created for managing data through the at least one flexible ADO.Net provider dll or library.

In an embodiment of the present invention, the at least one flexible ADO.Net provider dll or library using the at least one customized DLL and the routing service connects to a data store including web services and returns data to at least one client using a IDataReader, IDataRecord, a IDbCommand and a IDataParameter interfaces.

Aspect of the invention may include the routing service routing a request from the at least one flexible ADO.Net provider dll or library to connect to the at least one customized DLL. The routing service further comprising sending a response back to the at least one flexible ADO.Net provider dll or library.

Figure 2:
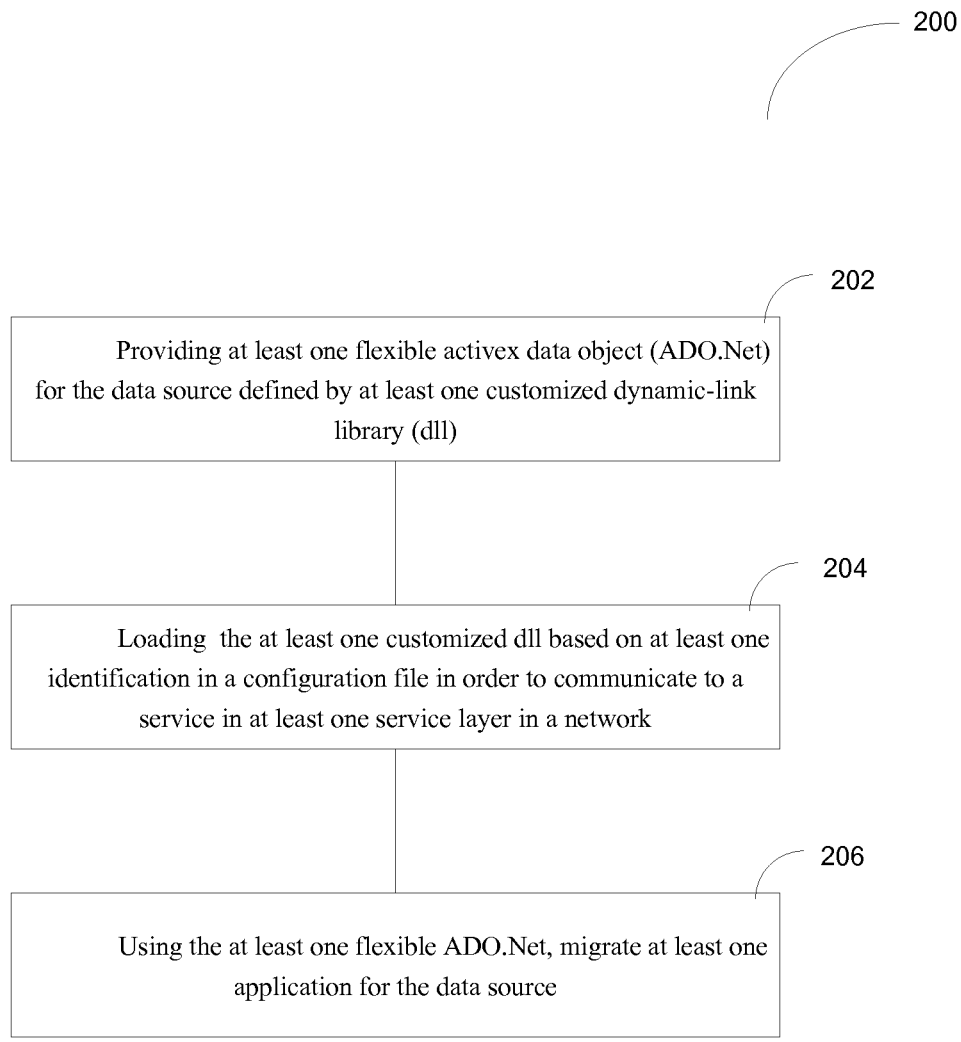
FIG. 2 illustrates a flow diagram for configuring the flexible ADO.NET for a data source in accordance with certain aspects of the disclosure.

FIG. 2 is an example of a flow diagram illustrating a process 200 of a system performing action in response to an instruction in accordance certain aspects of the present disclosure.

Process 200 begins at 202 by executing application code includes providing at least one flexible activex data object (ADO) .NET for the data source defined by at least one customized dynamic-link library (DLL). At 204, loading the at least one customized DLL based on at least one identification in a configuration file in order to communicate to a service in at least one service layer in a network. At 206, using the at least one flexible ADO.Net provider dll or library migrate at least one application for the data source. The invention includes providing the advantages of SOA with the familiarity of ADO.Net. Using this custom ADO.Net provider, the user migrates from direct connection to the data source to the SOA, it requires fewer changes since the data exposed through ADO.net but abstracted by the custom assemblies used by the remote service.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage or a database media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer implemented method for executing application code to access data and a data source through a data-sharing application, the method comprising:
    providing at least one flexible activex data object (ADO) .Net for the data source defined by at least one customized dynamic-link library (DLL);
    loading the at least one customized DLL based on at least one identification in a configuration file in order to communicate to a service in at least one service layer in a network; and
    using the at least one flexible ADO.Net provider dll or library, migrate at least one application for the data source and abstracted by the at least one customized DLL used by a remote service, wherein a server routes at least one command from the at least one flexible ADO.Net provider dll or library to a correct at least one customized DLL to handle the at least one command.

2. The method of claim 1, wherein the at least one flexible ADO.Net provider dll or library is installed on at least one client workstation.

3. The method of claim 2, wherein the at least one flexible ADO.Net provider dll or library does not require different libraries on the at least one workstation to communicate at least one computer readable instruction including a open database connectivity (ODBC) or a object linking database (OLDDB) providers.

4. The method of claim 3, wherein the at least one flexible ADO.Net provider dll or library communicates with a routing service to route the at least one computer readable instruction from the at least one flexible ADO.Net provider dll or library to the at least one customized DLL to manage the at least one computer readable instruction.

5. The method of claim 1, wherein the at least one customized DLL is created for managing data through the at least one flexible ADO.Net provider dll or library.

6. The method of claim 1, wherein the at least one customized DLL is installed on a server with a routing service.

7. The method of claim 6, wherein the at least one flexible ADO.Net provider dll or library using the at least one customized DLL and the routing service connects to any data store including web services.

8. The method of claim 6, wherein the at least one flexible ADO.Net provider dll or library using the at least one customized DLL and the routing service connects to a data store including web services and returns data to at least one client using a IDataReader, IDataRecord, a IDbCommand and a IDataParameter interfaces.

9. The method of claim 6, wherein the routing service includes routing a request from the at least one flexible ADO.Net provider dll or library to connect to the at least one customized DLL.

10. The method of claim 6, wherein the routing service further comprising sending a response back to the at least one flexible ADO.Net provider dll or library.

11. A computing device for executing application code to access data and a data source through a data-sharing application, the computing device comprising:
a processor;
a memory operably coupled to the processor and storing instructions to configure the computing device to analyze computer code via operations comprising:
provide at least one flexible activex data object (ADO) .Net for the data source defined by at least one customized dynamic-link library (DLL);
load the at least one customized DLL based on at least one identification in a configuration file in order to communicate to a service in at least one service layer in a network; and
use the at least one flexible ADO.Net provider dll or library, migrate at least one application for the data source and abstracted by the at least one customized DLL used by a remote service; and wherein a server routes at least one command from the at least one flexible ADO.Net provider dll or library to a correct at least one customized DLL to handle the at least one command.

12. The computing device of claim 11, wherein the at least one flexible ADO.Net provider dll or library is installed on at least one client workstation.

13. The computing device of claim 12, wherein the at least one flexible ADO.Net provider dll or library does not require different libraries on the at least one workstation to communicate at least one computer readable instruction including a open database connectivity (ODBC) or a object linking database (OLDDB) providers.

14. The computing device of claim 13, wherein the at least one flexible ADO.Net provider dll or library communicates with a routing service to route the at least one computer readable instruction from the at least one flexible ADO.Net provider dll or library to the at least one customized DLL to manage the at least one computer readable instruction.

15. The computing device of claim 11, wherein the at least one customized DLL is created for managing data through the at least one flexible ADO.Net provider dll or library.

16. The computing device of claim 11, wherein the at least one customized DLL is installed on a server with a routing service.

17. The computing device of claim 16, wherein the at least one flexible ADO.Net provider dll or library using the at least one customized DLL and the routing service connects to any data store including web services.

18. The computing device of claim 16, wherein the at least one flexible ADO.Net provider dll or library using the at least one customized DLL and the routing service connects to a data store including web services and returns data to at least one client using a IDataReader, IDataRecord, a IDbCommand and a IDataParameter interfaces.

19. A non-transitory computer readable medium having computer-executable instructions embodied thereon, the computer-executable instructions upon execution configuring a computer to perform operations for executing application code to access data and a data source through a data-sharing application comprising, the computer-readable medium comprising code for:
providing at least one flexible activex data object (ADO) .Net for the data source defined by at least one customized dynamic-link library (DLL);
loading the at least one customized DLL based on at least one identification in a configuration file in order to communicate to a service in at least one service layer in a network; and
using the at least one flexible ADO.Net provider dll or library, migrate at least one application for the data source and abstracted by the at least one customized DLL used by a remote service; and
wherein a server routes at least one command from the at least one flexible ADO.Net provider dll or library to a correct at least one customized DLL to handle the at least one command.

20. The computer readable media of claim 19, wherein the at least one flexible ADO.Net provider dll or library is installed on at least one client workstation.

* * * * *